United States Patent Office
3,478,091
Patented Nov. 11, 1969

3,478,091
2-AMIDO-2-ALKENESULFONATES
Donald L. Murfin, Mayfield Heights, and Leonard E. Miller, Chagrin Falls, Ohio, assignors to The Lubrizol Corporation, Wickliffe, Ohio, a corporation of Ohio
No Drawing. Filed Apr. 24, 1968, Ser. No. 723,894
Int. Cl. C07c *143/16;* C08f *3/84*
U.S. Cl. 260—513                                   6 Claims

ABSTRACT OF THE DISCLOSURE 2-amido-2-alkenesulfonic acids are prepared by reacting a ketone having at least one hydrogen atom in each alpha position with a nitrile and sulfuric acid, the nitrile being present in large excess. The acids and their salts are useful as detergents, surfactants and (where the nitrile is unsaturated) monomers for the formation of homopolymers and interpolymers. The copolymers with acrylonitrile have improved affinity for basic dyes as compared with acrylonitrile homopolymers.

---

This invention relates to new compositions of matter, both monomeric and polymeric, and to methods for their preparation. More particularly, it relates to compounds having the formula

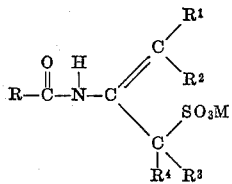

wherein R is a hydrocarbon radical; each of $R^1$, $R^2$, $R^3$ and $R^4$ is individually hydrogen or a hydrocarbon radical; and M is hydrogen or one equivalent of a salt-forming cation.

As used herein, the term "hydrocarbon radical" includes alkyl, cycloalkyl, aryl, aralkyl and alkaryl radicals. Also included are substantially hydrocarbon radicals; that is, radicals containing other substituents or atoms which do not adversely affect or detract materially from the hydrocarbon character of the radicals. These include radicals containing, for example, halogen atoms or ether, ester or nitro groups, and heterocyclic radicals such as furanyl, indolyl or pyridyl.

In accordance with this definition, R may be a radical such as methyl, ethyl, n-propyl, isopropyl, n-butyl, isobutyl, n-amyl, nonyl, heptadecyl, vinyl, isopropenyl, cyclohexyl, phenyl, o-tolyl, p-chlorophenyl, p-nitrophenyl, octadecylphenyl, α-naphthyl, 2-pyridyl or the like. It is preferably an alkyl, alkenyl or alkaryl radical, and desirably a vinyl or isopropenyl radical.

The radicals $R^{1-4}$ may be hydrogen or hydrocarbon radicals as defined above; or any two of $R^{1-4}$ may, together with their connecting structure, form a cyclic radical. Preferably, $R^1$ and $R^3$ are alkyl radicals containing about 1–20 carbon atoms, or together with their connecting structure form a cycloalkenyl radical, and $R^2$ and $R^4$ are hydrogen.

The following are illustrative of the compounds of this invention.

Barium 2-acetamido-2-undecenesulfonate
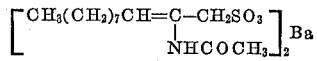

Barium 2-acetamido-2-nonadecenesulfonate
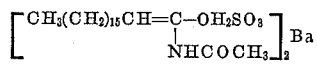

Barium 2-isobutyramido-2-nonadecenesulfonate
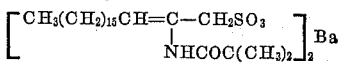

1-methyl-2-stearamido-2-butenesulfonic acid
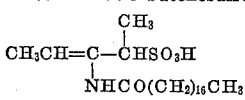

1-methyl-2-octadecylbenzamido-2-butenesulfonic acid
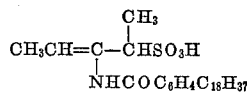

Ammonium 1-methyl-2-acrylamido-2-butenesulfonate
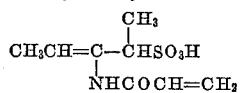

Ammonium 2-acrylamido-4-methyl-2-pentenesulfonate
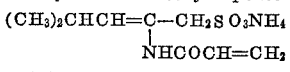

Ammonium 1-(2-propyl)-2-acrylamido-4-methyl-2-pentenesulfonate
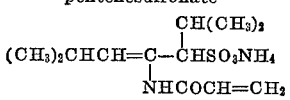

Ammonium 2-acrylamido-2-cyclohexenesulfonate
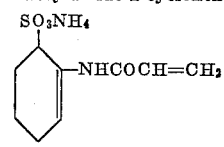

Sodium 1,3-diphenyl-2-methacrylamido-2-propenesulfonate
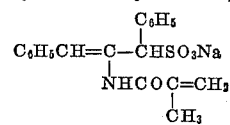

Sodium 1,3-di-(2-pyridyl)-2-methacrylamido-2-propenesulfonate
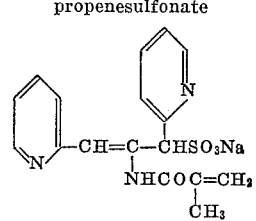

The compounds of this invention may be prepared by reacting a nitrile of the formula RC≡N with sulfuric acid and a ketone of the formula

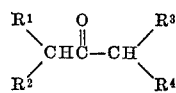

wherein R, $R^1$, $R^2$, $R^3$ and $R^4$ are as defined hereinabove. The molar ratio of sulfuric acid to ketone in the reaction mixture should be between about 1:1 and 10:1, and the molar ratio of nitrile to ketone must be at least about 5:1 and is preferably between about 10:1 and 50:1. That is, the nitrile must always be present in excess; otherwise, other compounds such as N-3-oxohydrocarbon-substituted amides are the major products.

In a preferred method for preparing the compounds of this invention, the nitrile and ketone are mixed and the sulfuric acid is added thereto. During the addition, the temperature of the reaction mixture is maintained at about 40–60° C., preferably around 50° C. If the temperature is too low the reaction occurs too slowly for convenient operation; if it is too high a resinous material is obtained in addition to the desired product.

The sulfuric acid used in the reaction is preferably of at least 95° strength. In general, the induction period for the reaction is shorter if a more concentrated acid is used; however, when certain high molecular weight ketones are used it is found that 98% acid converts the ketone primarily to its sulfonated derivative and no appreciable amount of 2-amido-2-alkenesulfonate is obtained. Usually, about 96–98% sulfuric acid is suitable. It may occasionally be advantageous to remove water from the reaction mixture at an early stage by adding polyphosphoric acid or a similar dehydrating agent along with the sulfuric acid; however, this expedient is rarely necessary.

It has been found that the highest yields of the desired product are obtained when the acid is added rapidly to the ketone-nitrile mixture. If the acid is added slowly, the principal product is usually the N-3-oxohydrocarbon-substituted amide.

The reaction between ketone, nitrile and sulfuric acid begins after an induction period which varies according to the amount of water in the reaction mixture. There is frequently a sudden and marked increase in temperature when the reaction begins, and it is important that the temperature be controlled to avoid a too sudden rise at this point. In general, the temperature should be maintained below about 80° C., and preferably about 40–60° C. Since the reaction is frequently very rapid and side reactions are possible unless the conditions are very closely controlled, it may be necessary to cool the mixture as soon as the exotherm occurs to stop the reaction from getting out of hand. Especially when an unsaturated nitrile is used, the reaction mixture should be cooled to about 15° C. or lower as soon as the exotherm is noted. The mixture is then immediately neutralized with a suitable weak base. Ammonia is the preferred base, but other materials such as amines, sodium carbonate, sodium bicarbonate or the like may be used. Strong bases are unsatisfactory since they cause cleavage of the product.

The sulfonic acid salt ordinarily precipitates during neutralization, and may be filtered and purified by recrystallization or a similar technique. Many of the sulfonates are hygroscopic in contact with water-soluble solvents, and therefore they should preferably be dried as soon as possible.

If the free sulfonic acid is desired, it may be obtained from the salt by careful neutralization, preferably by treatment with a cation exchange resin in the hydrogen form. The free acids are normally viscous liquids or solids. Other salts may be prepared by double decomposition or by neutralization of the free acid.

The preparation of the compounds of this invention is illustrated by the following examples.

EXAMPLE 1

A 1-liter reaction vessel is fitted with a stirrer, an inlet tube for ammonia, and a set of cooling coils coupled to a temperature control means. The flask is charged with 410 grams (10 moles) of acetonitrile and 85 grams (0.5 mole) of 2-undecanone. To this mixture is added rapidly 98 grams (1.0 mole) of 96% sulfuric acid. The temperature is maintained at 60° C. for about 10 minutes, at which point the reaction suddenly becomes exothermic and the temperature rises to 78° C. The mixture is stirred for one hour, and cooled to 15° C. and neutralized by blowing with anhydrous ammonia. The ammonium salt which precipitates is dissolved in hot water and an aqueous solution of barium chloride is added, followed by a dilute potassium hydroxide solution. There is obtained 82 grams (51% of the theoretical amount) of a brownish-white precipitate of barium 2-acetamido-2-undecenesulfonate.

EXAMPLE 2

To a mixture of 410 grams (10 moles) of acetonitrile and 70.5 grams (0.25 mole) of a 2-nonadecanone is rapidly added 74 grams (0.75 mole) of 96% sulfuric acid. The mixture is warmed to 55° C. and maintained at this temperature, with stirring for 40 minutes, after which time the temperature suddenly rises. The reaction mixture is cooled to maintain the temperature at 55° C. for an additional 20 minutes, after which it is cooled to 15° C. and blown with anhydrous ammonia. Methanol, 600 ml., is added during the neutralization with ammonia to aid in dissolution of the salt. The mixture is filtered and the solid residue is extracted with 1 liter of methanol. The extract is combined with the filtrate and the combined solutions are evaporated under reduced pressure. The solids are dissolved in 1 liter of methanol, filtered and again evaporated to dryness. There is obtained 79.6 grams (72.4% of the theoretical amount) of a yellow-brown waxy solid.

A portion of the ammonium salt thus obtained is dissolved in hot water and a solution of barium chloride is added. Upon cooling, there is obtained a white precipitate which is filtered and dried. The product is the desired barium 2-acetamido-2-nonadecenesulfonate.

EXAMPLE 3

To a mixture of 345 grams (5 moles) of isobutyronitrile and 37 grams (0.125 mole) of 2-nonadecanone is added, with stirring, 38 grams (0.375 mole) of 96% sulfuric acid. The mixture is heated to 55° C. for 15 minutes, after which the temperature is increased to 60° C. for 39 minutes and to 65° C. for 20 minutes. The mixture is then cooled to 10° C. and blown with ammonia until neutral. After filtration, the solids are extracted with 1000 ml. of methanol and the extract is evaporated under reduced pressure to 200 ml. and filtered. The filtrate is evaporated to dryness and a large excess of acetone is added. The precipitate thus obtained is dried under reduced pressure.

A portion of the ammonium salt thus obtained is dissolved in hot water and an aqueous solution of barium chloride is added. The barium 2-isobutyramido-2-nonadecenesulfonate thus obtained is dried in vacuum.

EXAMPLE 4

To a mixture of 397 grams (7.5 moles) of acrylonitrile and 43 grams (0.5 mole) of 3-pentanone is added a mixture of 75 grams (0.75 mole) of 96% sulfuric acid and 25 grams (0.25 mole) of 20% fuming sulfuric acid. The reaction mixture is heated to 55° C. and maintained at that temperature for two hours, after which the temperature increases rapidly. Cooling is immediately begun and the temperature begins to drop when it has reached 65° C. The mixture is cooled to 20° C. and blown with ammonia, and the solids are removed by filtration and extracted with hot methanol. From the methanol solution there is recovered 75.6 grams of a yellow solid which is the desired product, ammonium 1-methyl-2-acrylamido-2-butenesulfonate.

EXAMPLE 5

A mixture of 74 grams (0.75 mole) of 96% sulfuric acid and 25 grams (0.25 mole) of 20% fuming sulfuric acid is added rapidly to a solution of 50 grams (0.5 mole) of 4-methyl-2-pentanone in 397 grams (7.5 moles) of acrylonitrile. The reaction mixture is heated at 55° C. until the exotherm occurs and then is rapidly cooled to 15° C. and blown with ammonia. After filtration, the liquid is allowed to stand in contact with air for 22 hours, during which time light yellow crystals precipitate. The nuclear magnetic resonance spectrum of these crystals shows the product to be ammonium 2-acrylamido-4-methyl-2-pentenesulfonate.

EXAMPLE 6

Following the procedure of Example 4, ammonium 1-(2-propyl)-2-acrylamido-4-methyl-2-pentenesulfonate is prepared from 265 grams (5 moles) of acrylonitrile, 142 grams (1 mole) of 2,6-dimethyl-4-heptanone and 204 grams (2 moles) of 96% sulfuric acid.

EXAMPLE 7

To a mixture of 397 grams (7.5 moles) of acrylonitrile and 49 grams (0.5 mole) of cyclohexanone is added rapidly 74 grams (0.75 mole) of 96% sulfuric acid and 26.5 grams (0.27 mole) of 20% fuming sulfuric acid. The temperature is maintained at 55° C. until the exotherm occurs and then is rapidly lowered to 10° C., after which the mixture is blown with ammonia. The solid material is removed by filtration and extracted with 1 liter of methanol, and the methanolic filtrate is evaporated in vacuum and poured into 1.5 liters of acetone. There is obtained 22.4 grams of ammonium 2-acrylamido-2-cyclohexenesulfonate, a yellow solid. The product is dried in vacuum.

The compounds of this invention wherein R is an alkyl, cycloalkyl, alkaryl or aralkyl radical are useful as detergents and surfactants in aqueous systems. Especially useful for this purpose are high molecular weight products such as the products of Examples 1, 2 and 3 and compounds prepared from a lower molecular weight ketone and stearonitrile, octadecylbenzonitrile or the like.

The compounds of this invention wherein R is an alkenyl radical, especially a vinyl or isopropenyl radical, may be polymerized under free-radical conditions, either alone or with other monomers, to form useful polymers. The term "polymer," as used herein, includes homopolymers, copolymers, terpolymers and other interpolymers. Polymerization may be effected in bulk, solution, suspension or emulsion, by contacting the monomer or monomers with a polymerization initiator either in the absence or presence of a diluent at a temperature of about 0–200° C. Suitable free-radical initiators include benzoyl peroxide, tertiary butyl hydroperoxide, acetyl peroxide, hydrogen peroxide, azobisisobutyronitrile, sodium persulfate, ammonium persulfate, chloriate-sulfite and the like. Solution polymerization may be effected in a polar organic solvent, preferably a lower molecular weight alcohol such as methanol or ethanol. Emulsion and suspension polymerization are conveniently effected in water or a mixture of water with a hydroxylated organic solvent.

Suitable emulsifiers for use in the preparation of emulsion polymers of this invention include cationic materials such as stearyl dimethyl benzyl ammonium chloride; nonionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose, gum arabic, dextrins or polyvinyl alcohol.

A large variety of monomers can be used to form interpolymers with the compounds of this invention. They include, but are not limited to, (1) esters of unsaturated alcohols, (2) esters of unsaturated acids, (3) esters of unsaturated polyhydric alcohols (e.g., butenediol), (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

(1) Esters of unsaturated alcohols: Allyl, methallyl, crotyl, 1-chloroallyl, 2-chloroallyl, cinnamyl, vinyl, methylvinyl, 1-phenallyl, butenyl esters of (a) saturated acids such as acetic, propionic, butyric, valeric, caproic and stearic; (b) unsaturated acids such as acrylic, alpha-substituted acrylic (including alkylacrylic, e.g., methacrylic, ethylacrylic, propylacrylic, etc., and arylacrylic such as phenylacrylic), crotonic, oleic, lineoleic and linolenic; (c) polybasic acids such as oxalic, malonic, succinic, glutaric, adipic, pimelic, suberic, azelaic and sebacic; (d) unsaturated polybasic acids such as maleic, fumaric, citraconic, mesaconic, itaconic, methylenemalonic, acetylenediarboxylic and aconitic; (e) aromatic acids, e.g., benzoic, phenylacetic, phthalic, terephthalic and benzoylphthalic acids.

(2) Esters of saturated alcohols, such as methyl, ethyl, propyl, isopropyl, butyl, isobutyl, sec-butyl, tert-butyl, 2-ethylhexyl, cyclohexyl or behenyl alcohols, with unsaturated aliphatic monobasic and polybasic acids, examples of which are illustrated above.

(3) Esters of unsaturated polyhydric alcohols, e.g., butenediol, with saturated and unsaturated aliphatic and aromatic, monobasic and polybasic acids, illustrative examples of which appear above.

(4) Vinyl cyclic compounds including (a) monovinyl aromatic hydrocarbons e.g., allylbenzene, o-, m-, p-chlorostyrenes, -bromostyrenes, -fluorostyrenes, -methylstyrenes, -ethylstyrenes, -cyanostyrenes; di-, tri-, and tetra-, etc., -chlorostyrenes, -bromostyrenes, -fluorostyrenes, -methylstyrenes, -ethylstyrenes, -cyanostyrenes; vinylnaphthalene, vinylcyclohexane; (b) corresponding polyvinyl compounds such as divinylbenzene and trivinylbenzene; and (c) vinyl heterocycles such as vinylfuran, vinylpyridine, vinylbenzofuran, N-vinylcarbazole, N-vinylpyrrolidone and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether and allyl ethyl ether.

(6) Unsaturated ketones, e.g., methyl vinyl ketone and ethyl vinyl ketone.

(7) Unsaturated amides, such as acrylamide, methacrylamide, N-methylacrylamide, N-phenylacrylamide, N-allylacrylamide, N-methylolacrylamide, N-(1,1-dimethyl-3-oxobutyl)acrylamide and N-allylcaprolactam.

(8) Unsaturated aliphatic hydrocarbons, for instance, ethylene, propylene, butenes, butadiene, isoprene, 2-chlorobutadiene and alpha-olefins in general.

(9) Vinyl halides, e.g., vinyl fluoride, vinyl chloride, vinyl bromide, vinylidene chloride vinylidene bromide, allyl chloride and allyl bromide.

(10) Unsaturated acids (for example, acrylic, methacrylic, propylacrylic), examples of which appear above.

(11) Unsaturated acid anhydrides, e.g., maleic citraconic, itaconic, cis-4-cyclohexene-1,2-dicarboxylic and bicyclo(2,2,1)-5-heptene-2,3-di-carboxylic anhydrides.

(12) Unsaturated acid halides such as cinnamoyl, acrylyl, methacrylyl, crotonyl, oleyl and fumaryl chlorides or bromides.

(13) Unsaturated nitriles, e.g., acrylonitrile, methacrylonitrile and other substituted acrylonitriles.

Polymerizable compounds of the present invention are especially useful for copolymerization with acrylonitrile or methacrylonitrile. The copolymers thus formed have substantially greater affinity for basic dyes than do acrylonitrile or methacrylonitrile homopolymers. Preferred copolymers contain about 70–95% (by weight) of acrylonitrile or methacrylonitrile units and about 5–30% of units derived from the compounds of this invention.

The preparation of the polymers of this invention is illustrated by the following examples.

EXAMPLE 8

A reaction vessel fitted with a reflux condenser, stirrer, nitrogen inlet and addition funnel is charged with 450 ml. of water and 1.5 ml. of 1% aqueous sulfuric acid. The vessel is flushed with nitrogen and 21.2 grams of acrylonitrile and 5.3 grams of ammonium 1-methyl-2-acrylamido-2-butenesulfonate are added, with stirring. There are then added a solution of 0.86 gram of ammonium persulfate in 25 ml. of water and a solution of 0.36 gram of sodium metabisulfite in 25 ml. of water. The mixture is stirred for 4 hours at room temperature and is then filtered; the milky filtrate is evaporated nearly to dryness and triturated with about 500 ml. of acetone. The desired 80:20 (by weight) copolymer of acrylonitrile and ammonium 1-methyl-2-acrylamido-2-butenesulfonate is allowed to stand in contact with the acetone overnight and is then filtered, washed with methanol and dried in vacuum.

EXAMPLE 9

Following the procedure of Example 8, an 85:15 copolymer of acrylonitrile and ammonium 1-methyl-2-acrylamido-2-butenesulfonate is prepared.

EXAMPLE 10

Following the procedures of Example 8, a 90:10 copolymer of acrylonitrile and ammonium 1-methyl-2-acrylamido-2-butenesulfonate is prepared. After the polymerization reaction is complete, the polymer is collected by filtration, washed with distilled water and methanol and dried under vacuum.

EXAMPLE 11

Following the procedure of Example 10, a 95:5 copolymer of acrylonitrile and ammonium 1-methyl-2-acrylamido-2-butenesulfonate is prepared.

EXAMPLE 12

To a solution of 27 grams of ethyl acrylate and 3 grams of ammonium 2-acrylamido-4-methyl-2-pentenesulfonate in 300 ml. of methanol is added 0.4 gram of benzoyl peroxide. The reaction mixture is stirred until polymerization is complete, after which time the polymer is removed by filtration. The product is a 90:10 copolymer of ethyl acrylate with ammonium 2-acrylamido-4-methyl-2-pentenesulfonate.

EXAMPLE 13

The procedure of Example 12 is repeated, using 27 grams of vinyl acetate and 3 grams of ammonium 2-acrylamido-2-cyclohexenesulfonate as the monomers. A 90:10 copolymer is obtained.

EXAMPLE 14

A solution of 1.5 grams of ammonium 1-methyl-2-acrylamido-2-pentenesulfonate in 300 grams of methanol is cooled to $-20°$ C. and 28.5 grams of vinyl chloride is passed in. To the solution, maintained at $-20°$ C., is added 0.4 gram of azobisisobutyronitrile. The mixture is agitated for several hours, and is allowed to warm gradually to room temperature as polymerization continues. The 95:5 copolymer of vinyl chloride and ammonium 1-methyl-2-acrylamido-2-pentenesulfonate is removed by filtration and dried in vacuum.

EXAMPLE 15

The procedure of Example 12 is repeated, using 27 grams of styrene and 3 grams of ammonium 2-acrylamido-4-methyl-2-pentenesulfonate as comonomers. A 90:10 copolymer is obtained.

EXAMPLE 16

To a solution of 8 grams of acrylamide, 2 grams of ammonium 1-methyl-2-acrylamido-2-butenesulfonate and 2 ml. of 1% aqueous sulfuric acid in 200 ml. of water is added, with stirring and in a nitrogen atmosphere, 10 ml. each of a 3.4% aqueous solution of ammonium persulfate and a 1.4% solution of sodium metabisulfite. The mixture is stirred at 35° C. for 18 hours and is then concentrated to 20 ml. and poured into an excess of acetone. The desired 80:20 copolymer of acrylamide and ammonium 1-methyl - 2 - acrylamido-2-butenesulfonate is removed by filtration, washed with acetone and methanol and dried in vacuum.

EXAMPLE 17

A solution of 5 grams of ammonium 1-methyl-2-acrylamido-2-butenesulfonate and 0.15 ml. of 1% aqueous sulfuric acid in 45 ml. of water is placed in a reaction vessel and flushed with nitrogen, after which 5 ml. each of the ammonium persulfate and sodium metabisulfite solutions of Example 16 are added. The solution is stirred for 18 hours at 35° C. and is then evaporated to dryness under reduced pressure. The glassy polymer is dissolved in 100 ml. of methanol and the methanol solution is evaporated to dryness. The polymer is again dissolved in methanol and the methanol solution is concentrated and poured into an excess of alcohol. The solid homopolymer precipitates and is removed by filtration and dried.

Films prepared for the copolymers of Examples 8–10 were evaluated from dyeability, using Malachite Green, a basic dye. They were found to absorb substantially more dye than corresponding homopolymers of acrylonitrile.

What is claimed is:

1. A compound having the formula

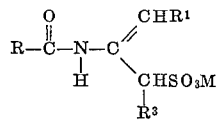

wherein R is an alkyl, alkenyl or alkaryl radical; each of $R^1$ and $R^3$ is an alkyl radical containing about 1–20 carbon atoms, or $R^1$ and $R^3$, together with their connecting structure, form a cycloalkenyl radical; and M is hydrogen or one equivalent of a salt-forming cation.

2. A compound according to claim 1 wherein R is a vinyl or isopropenyl radical.

3. A method for the preparation of a compound having the formula

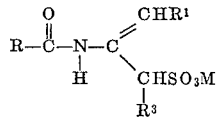

wherein R is an alkyl, alkenyl or alkaryl radical; each of $R_1$ and $R_3$ is an alkyl radical containing about 1–20 carbon atoms, or $R^1$ and $R^3$, together with their connecting structure, form a cycloalkenyl radical; and M is hydrogen or one equivalent of a salt-forming cation; which comprises reacting a nitrile of the formula RCN with sulfuric acid and a ketone of the formula

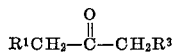

the molar ratio of sulfuric acid to said ketone being between about 1:1 and 10:1 and the molar ratio of said nitrile to said ketone being at least about 5:1.

4. A method according to claim 3 wherein the molar ratio of nitrile to ketone is between about 10:1 and 50:1.

5. A method according to claim 4 wherein the nitrile and ketone are first mixed and the sulfuric acid is subsequently added thereto, the temperature during the addition of said acid being maintained at about 40–60° C.

6. A method according to claim 5 wherein R is a vinyl or isopropenyl radical and each of $R^1$ and $R^3$ is individually an alkyl radical containing about 1–20 carbon atoms.

References Cited

UNITED STATES PATENTS 3,317,589   5/1967   Vitalis et al.
3,330,856   7/1967   Broussalian.

DANIEL D. HORWITZ, Primary Examiner

U.S. Cl. X.R.

252—161; 260—66, 78.5, 79.3, 294.8, 401, 503, 507